3,652,509
COPOLYAMIDES OF PARAXYLYLENE DIAMINE
Yoshizo Tsuda, Akinori Yamamoto, and Masamitsu Tanimura, Otsu-shi, Japan, assignors to Toray Industries, Inc., Tokyo, Japan
No Drawing. Filed Nov. 18, 1969, Ser. No. 877,851
Claims priority, application Japan, Nov. 27, 1968, 43/86,397
Int. Cl. C08g 20/20
U.S. Cl. 260—78 R                                                26 Claims

ABSTRACT OF THE DISCLOSURE

The present invention relates to a polyamide, and a fiber thereof, consisting of a novel paraxylylene copolyamide. More particularly, the invention relates to a polyamide fiber consisting of a copolyamide of paraxylylene diamine with two $\alpha$-$\omega$ dicarboxylic alkanes each having 6–13 carbon atoms and differing from one another in that one of said acids has 1–2 carbon atoms more than the other.

---

This invention pertains to spinnable, low melting point copolyamides of paraxylylene diamine. Polyamides prepared industrially in large amounts include nylon 66, obtained by condensation polymerization of adipic acid and hexamethylene diamine and nylon 6 obtained by self-condensation of epsilon-caprolactam. Whereas synthetic fibers of these polyamides have some excellent characteristics, such as proper tenacity and elongation and high dyeability, they are not always suitable for use as outer garments because of their low Young's modulus and low dimensional stability.

Therefore, polyamides having an aromatic ring, such as polyamides prepared from p-xylylene diamine or m-xylylene diamine and various kinds of dicarboxylic alkanes (sometimes otherwise referred to herein as aliphatic dicarboxylic acids) have been proposed as polyamides which are excellent in dimensional stability or initial Young's modulus. However, because polyamides of m-xylylene diamine are low in modulus in the hot wet condition, they have not been industrialized. On the other hand, a polyamide of p-xylylene diamine has a high melting point (above about 270° C.); moreover, when its temperature exceeds about 300° C., this polyamide decomposes or colors. Particularly, in polymerization and melt spinning operations, therefore, there are problems such as decomposition, gelation and coloration of the polymer. This polyamide is therefore not suitable for preparing fibers.

In order to eliminate the aforesaid deficiencies of these polyamides of aromatic diamines, methods of copolymerizing various kinds of nylon salts including copolymerizable components of aromatic polyamides have been proposed. In fact, isomorphous copolymerization has been effectively used to produce aromatic copolyamides having slightly lowered melting points and crystallinity.

Examples of this are copolyamides having as their diamine components paraxylylene diamine in combination with hexamethylene diamine (U.S. Pat. 3,012,994) and paraxylylene diamine in combination with metaxylylene diamine.

These copolyamides are sometimes characterized as isomorphous because of their melting points. However, nothing is known about the degrees to which their crystallinities have been lowered by this "isomorphous" copolymerization or their fiber properties such as Young's modulus or the dimensional stabilities of fibers obtained from these copolymers. Furthermore, there are problems when these "isomorphous" copolyamides are used as fibers. For example, a copolyamide from paraxylylene diamine and hexamethylene diamine has a deficiency in that as its melting point is lowered, its glass transition temperature is lowered also. On the other hand, a copolyamide from paraxylylene diamine and metaxylylene diamine has a deficiency in that its crystallinity is lowered to a large degree.

As a result of various examinations with a view to finding a low melting point aromatic copolyamide in which the glass transition temperature and crystallinity are not lowered by copolymerization, the present inventors have found an entirely novel isomorphous crystalline copolyamide system.

More specifically, it is an object of the present invention to provide a copolyamide having good crystallinity and a sufficiently high glass transition temperature, which is also excellent in dimensional stability, high in initial Young's modulus and low in shrinkage in boiling water.

A further object of the present invention is to provide a copolyamide having excellent characteristics for a textile useful in outerwear and for industrial purposes.

In a copolyamide according to the present invention, the dicarboxylic acid component consists of a mixture of two $\alpha,\omega$ dicarboxylic alkanes each having 6–13 carbon atoms. However, it is necessary that one of these two dicarboxylic alkanes have one or two carbon atoms more than the other. The amine component of this copolyamide consists of paraxylylene diamine.

If two dicarboxylic alkanes are used the numbers of carbon atoms of which are different by three or more carbon atoms, the crystallinity of the obtained copolyamide is relatively low. There are further deficiencies in that the dimensional stability is also lowered and the shrinkage in boiling water increased.

The number of carbon atoms in the dicarboxylic alkane used in the present invention is preferably within the range of 6–13. If a dicarboxylic alkane having less than 6 carbon atoms is used, even in a mixture with another dicarboxylic alkane having one or more carbon atoms, the polymeric product has too high a melting point and is therefore not preferred. On the other hand, because dicarboxylic alkanes having more than 13 carbon atoms are not readily available in industrial quantities, the use of such acids is not practical.

Within the foregoing technical and practical limitations, the following thirteen combinations of dicarboxylic alkanes, sometimes referred to hereafter as aliphatic dicarboxylic acids or dicarboxylic acids may be used in the present invention.

(1) Adipic acid and pimelic acid
(2) Adipic acid and suberic acid
(3) Pimelic acid and suberic acid
(4) Pimelic acid and azelaic acid
(5) Suberic acid and azelaic acid
(6) Suberic acid and sebacic acid
(7) Azelaic acid and sebacic acid
(8) Azelaic acid and undecanedioic acid
(9) Sebacic acid and undecanedioic acid
(10) Sebacic acid and dodecanedioic acid
(11) Undecanedioic acid and dodecanedioic acid
(12) Undecanedioic acid and tridecanedioic acid
(13) Dodecanedioic acid and tridecanedioic acid As to the copolymerization ratio of said mixture of aliphatic dicarboxylic acids, it is preferable that one dicarboxylic acid component comprise 90–10 mole percent, preferably 75–25 mole percent, of the total dicarboxylic acid content of the mixture. When the copolymerization ratio of one dicarboxylic acid component is outside the range of 90–10 mole percent, the melting point of the copolyamide product is noticeably increased and decomposition and coloration of the polymer may occur during polymerization or melt spinning.

The effect of copolymerization ratio of dicarboxylic acid components may be seen in Tables 1, 2, and 3 in which are tabulated the melting points of copolyparaxylylene amides with various ratios of the components in combinations (10), (4), and (7) above. The amine component is paraxylylene diamine in all cases.

TABLE 1

| Component dicarboxylic acid (mole percent) | | Melting point (° C.) of the copolyamide product |
|---|---|---|
| Sebacic acid | Dodecane-dioic acid | |
| 100 | 0 | 276 |
| 90 | 10 | 272 |
| 70 | 30 | 263 |
| 50 | 50 | 245 |
| 30 | 70 | 260 |
| 10 | 90 | 270 |
| 0 | 100 | 273 |

TABLE 2

| Component dicarboxylic acid (mole percent) | | Melting point (° C.) of the copolyamide product |
|---|---|---|
| Pimelic acid | Azelaic acid | |
| 100 | 0 | 285 |
| 90 | 10 | 275 |
| 70 | 30 | 264 |
| 50 | 50 | 228 |
| 30 | 70 | 252 |
| 10 | 90 | 270 |
| 0 | 100 | 273 |

TABLE 3

| Component dicarboxylic acid (mole percent) | | Melting point (° C) of the copolyamide product |
|---|---|---|
| Azelaic acid | Sebacic acid | |
| 100 | 0 | 273 |
| 70 | 30 | 256 |
| 50 | 50 | 250 |
| 30 | 70 | 257 |
| 0 | 100 | 276 |

As will be understood from Tables 1, 2 and 3, the melting point of the copolyamides of the present invention, like copolyamides generally, decreases as the copolymerization ratio approaches 1:1. However, when in accordance with the present invention, the copolymerization ratio of one dicarboxylic acid component of a mixture of aliphatic dicarboxylic acids whose numbers of carbon atoms are different by one or two carbon atoms is within the range of 10–90 mole percent preferably 25–75 mole percent, not only is the melting point of the copolyamide product lowered to about 270° C. or lower but there are no problems such as gelation, decomposition and coloration upon polymerization and melt spinning. Instead, these problems, which may be due to a high melting point in the case of homopolyparaxyleneamide, for example, are avoided and stable melt spinning is possible.

As mentioned above, the present invention requires two α-ω aliphatic dicarboxylic acids each having 6–13 carbon atoms, and one having one or two more carbon atoms than the other. However, a small amount, less than 10 mole percent, of a third dicarboxylic acid component may also be included in the copolyamide of this invention.

In producing the copolyamides of the present invention, a conventional process for synthesizing a polyamide by heating ordinary nylon salts to produce polycondensation may be used. More particularly, the copolyamides according to the present invention are obtained by polymerizing two aliphatic dicarboxylic acids each having 6–13 carbon atoms, one of which has one or two more carbon atoms than the other, with paraxylylene diamine by mixing the nylon salts obtained from said aliphatic dicarboxylic acids and paraxylylene diamine at the required molar ratio, viz. so that the copolymerization ratio of the two kinds of the aliphatic dicarboxylic acids is within the range 10–90 mole percent, adding to the resultant mixture water and a viscosity control agent as occasion demands and polycondensing the obtained mixture with heating in an inert gas atmosphere such as nitrogen gas under superatmospheric or atmospheric pressure. Conventional polymerization conditions are used. For example, the method of synthesis may consist of polycondensing the mixture in an inert gas atmosphere, such as nitrogen, at a temperature of 280–290° C. under pressure; thereafter, reducing the pressure to atmospheric pressure or a reduced pressure as occasion demands. With respect to polymerization temperature, it is necessary to limit this temperature to a maximum of 300° C. because of the fact that the degree of polymerization of this copolyamide is lowered due to coloration and decomposition when the polymerization temperature exceeds 300° C.

The copolymerization ratio of paraxylylene diamine to the aliphatic dicarboxylic acids is susbtantially 1:1.

The copolyamide product of the present invention is excellent in spinnability and is similar in that respect to nylon 6 or nylon 66 which have hitherto been well-known as a material for the preparation of fibers. Melt spinning methods used with nylon 6 and nylon 66 may also be used with the copolyamide of the present invention. However, as mentioned above, when the temperature of this copolyamide exceeds 300° C., problems such as coloration and decomposition are apt to be brought about. Therefore, it is preferable that the melt spinning be carried out at a temperature of 300° C. or less.

As to drawing, cold drawing is not impossible. However, generally, hot drawing is suitable. As to the drawing temperature, when the number of carbon atoms in the two dicarboxylic acid reactants are both even numbers or when they differ only by one, i.e., are adjacent numbers, drawing is possible at a high temperature and a drawn yarn low in shrinkage in boiling water can be obtained. When the number of carbon atoms in the two acids are both odd numbers, it is preferable to carry out drawing at a temperature close to the glass transition temperature (90–100° C., for example, at 100° C.). Thereafter, by carrying out a constant length or relaxed heat treatment at high temperatures (for example, at 180° C.), a drawn yarn good in dimensional stability is obtained.

These drawn copolyamide yarns have high glass transition temperatures, 70–120° C. Their wet state glass transition temperatures are 40–60° C., higher than room temperature. In this respect, they compare favorably with aliphatic polyamides which have a wet state glass transition temperature generally below 0° C.

Further, the filaments of the copolyamide produced in accordance with the present invention are well oriented and crystallized by hot drawing. The fiber X-ray photograph produced with wide angle X-ray diffraction, about which there is more discussion hereinafter, shows an isomorphous pattern similar to the X-ray photograph of polyparaxyleneamide described by Vogelsong in the Journal of Polymer Science, volume 52, page 895 (1962), differing only in lattice spacing by an acid component and a mixing ratio. Further, the crystallinity of this copolyamide is good. The fiber periods of certain of the copolyamides of the present invention and certain similar homopolyamides of paraxylylene diamines also determined from the X-ray photographs, are listed in Table 4. It will be noted that polyparaxylylenesebacamide has a fiber period similar to that in the Vogelsong publication. The fiber period of a binary dicarboxylic acid polyparaxyleneamide according to the present invention is shown to take a value intermediate that of the fiber periods of homoparaxylylenepolyamides of the component dicarboxylic acids. The extent of dispersion of the fiber periods of the copolyamides is small, showing that the fiber periods vary only to a small degree.

TABLE 4

| Number | Dicarboxylic acid component | Fiber period (A) |
| --- | --- | --- |
| 1 | Pimelic acid ($C_7$) | 16.8 |
| 2 | Suberic acid ($C_8$) | 18.2 |
| 3 | Azelaic acid ($C_9$) | 19.5 |
| 4 | Sebacic acid ($C_{10}$) | 20.6 |
| 5 | Dodecanedioic acid ($C_{12}$) | 23.4 |
| 6 | Pimelic acid/azelaic acid (5/5 molar ratio) | 18.2 |
| 7 | Sebacic acid/dodecanedioic acid (5/5 molar ratio) | 21.3 |

(Wherein Nos. 1–5 are homopolyamides, while Nos. 6 and 7 are copolyamides.)

In Table 5, there is made a similar comparison of the lattice spacing of copolyamides of the present invention (Nos. 6–11) and the homopolyamides of paraxylylene diamine of the prior art (Nos. 1–5).

TABLE 5

| Number | Dicarboxylic acid component | Lattice spacing |
| --- | --- | --- |
| 1 | Pimelic acid | 6.9 |
| 2 | Suberic acid | 7.8 |
| 3 | Azelaic acid | 8.05 |
| 4 | Sebacic acid | 8.85 |
| 5 | Dodecanedioic acid | 9.8 |
| 6 | Pimelic acid/azelaic acid 70/30 molar ratio | 7.3 |
| 7 | Pimelic acid/azelaic acid (50/50 molar ratio) | 7.7 |
| 8 | Suberic acid/sebacic acid (50/50 molar ratio) | 8.1 |
| 9 | Dodecanedioic acid/sebacic acid (70/30 molar ratio) | 9.5 |
| 10 | Dodecanedioic acid/sebacic acid (50/50 molar ratio) | 9.3 |
| 11 | Dodecanedioic acid/sebacic acid (30/70 molar ratio) | 9.0 |

In polyamides of the paraxylylene series, as is seen in the Vogelsong reference, the X-ray diffraction pattern shows a strong diffraction spot existing on a second layer line and a line inclined by 30° from the meridian being observed. When its lattice spacing is measured and sought, the results are as shown in Table 5, from which it is understood that the crystal lattice spacing continuously varies not only by the kind of the copolymerization components but also by the composition ratio of said components.

As shown by the data tabulated in Tables 4 and 5, the copolymer fiber according to the present invention consists of a novel crystalline copolymer in which the packing state of crystals is unchanged due to degree of copolymerization (the equatorial line of interference is the same) and the length or period in a fiber axis direction takes a value varying in accordance with the composition ratio and intermediate the values of the homopolyparaxylyleneamides of the respective component dicarboxylic acids.

Moreover, yarn of said copolyamides, as mentioned above, is high in glass transition temperature, about 80–120° C., good in dimensional stability, high in initial Young's modulus, low in boiling water shrinkage and good in tensile strength and elongation as will be shown in the examples which follow.

Copolyamides of paraxylylenediamines with combinations of dicarboxylic acids in which the acids both have even numbers of carbon atoms or in which one acid has only one more carbon atom than the other are especially good in crystallinity and exhibit excellent dimensional stabilities even without heat treatment. When the number of carbon atoms in both acid components are odd numbers, crystallinity is increased and dimensional stability is advanced by hot drawing, more specifically, subjecting the drawn yarn to a heat treatment.

As will be apparent from what is mentioned above in detail, the copolyamides produced in accordance with the present invention is much preferred as a material for preparing a yarn and yarns obtained from said copolyamides are large in initial Young's modulus as compared with a yarn obtained from the conventional nylon 6 or nylon 66. Therefore, it is possible to provide an excellent textile material. Further, these copolyamides yield fibers for certain types of clothing products such as knitted goods, woven fabric, textured yarn and composite yarn, which have unique characteristics such as hand and feel. These copolyamides are also suitable in fiber form for industrial uses such as tire cord, rope and filter cloth.

It goes without saying that the copolyamide of the present invention is not limited to a material for preparing a yarn, but it can be used for shaping and processing into films and plastics or as paint for coating an electric wire.

Hereinbelow, the present invention will be explained with reference to examples. In these examples, the methods of measuring inherent viscosity, melting point, tenacity, elongation, initial Young's modulus, shrinkage in boiling water and glass transition temperature are as follows:

Inherent viscosity: The polymer is dissolved in concentrated sulfuric acid so that its concentration is 0.5%. Its inherent viscosity is measured at 30° C.

Melting point: A small piece of the polymer is put on a hot plate mounted on a polarizing microscope. The temperature of the hot plate is increased at a constant rate and the temperature at which the polarized light from the polymer disappears is measured.

Tenacity, elongation, Young's modulus: Using an Instron tester, a 25-cm. long copolyamide yarn is pulled at a tensile speed of 30 cm./min. until it breaks. From a chart which accompanies said tester, tenacity and elongation are determined. Young's modulus is determined from the stress-strain curve obtained in measuring tenacity and elongation.

Shrinkage in boiling water: A yarn is immersed in boiling water and boiled for 30 minutes. The change of length of the yarn before and after the treatment with boiling water is noted.

Glass transition temperature: The temperature at which the dynamic loss of fiber made of the polymer becomes maximum value is determined using a "Vibron" (an instrument designed for such purpose and available from the Toyo Sokki Company) to measure the temperature dependence of the dynamic modulus of the fiber.

EXAMPLE 1

To a mixture of 50 mole percent of paraxylylene diammonium dodecanedioate and 50 mole percent of paraxylylene diammonium sebacate, 0.2% by weight of benzoic acid was added as a viscosity control agent, the two were well mixed and charged in an autoclave, air inside the autoclave was replaced by nitrogen, the autoclave was heated in a bath at 265° C. and the content was polymerized under pressure. The pressure inside the autoclave was controlled to 10 kg./cm.² After heating for 2 hours, the pressure was released in 30 minutes, and the contents were heated at 265° C. under atmospheric pressure for 2 more hours to complete the polymerization. The obtained polymer had a melting point of 245° C. and an inherent viscosity of 1.13.

At a spinning temperature of 275° C., the polyamide thus produced was melt spun to obtain undrawn filaments good in drawability. These filaments were drawn to 4 times their original lengths using a hot plate at 180° C. to obtain a good drawn yarn having a tenacity of 5.0 g./d. (grams per denier), an elongation of 16.3%, an initial Young's modulus of 62.5 g./d. and a shrinkage in boiling water of 4.85%. The glass transition temperature of this polymer in a dry state was 93° C. and the glass transition temperature thereof in a wet state was 45° C.

EXAMPLES 2–4

Copolyparaxylyleneamides of various compositions polymerized as in Example 1 were melt spun as in Example 1. The compositions, polymer characteristics and yarn qualities of these copolyamides and drawn yarns produced therefrom are tabulated in Table 6.

TABLE 6
[Characteristics of Copolyparaxylyleneamides and Yarns Thereof]

| Example | 2 | 3 | 4 |
|---|---|---|---|
| Dicarboxylic acid composition (mole percent) | [1] 30 [2] 70 | [1] 70 [2] 30 | [3] 50 [1] 50 |
| Inherent viscosity | 1.14 | 1.12 | 0.90 |
| Melting point (° C.) | 260 | 263 | 260 |
| Spinning temperature (° C.) | 285 | 285 | 275 |
| Drawing temperature (° C.) | 180 | 180 | 180 |
| Drawing ratio | 5 | 5 | 5 |
| Tenacity (g./d.) | 4.88 | 4.55 | 2.77 |
| Elongation (percent) | 11.1 | 31.8 | 28.0 |
| Initial Young's modulus (g./d.) | 55.6 | 43.5 | 33.3 |
| Shrinkage in boiling water (percent) | 7.3 | 7.3 | 6.1 |

[1] Sebacic acid.
[2] Dodecanedioic acid.
[3] Suberic acid.

EXAMPLES 5–7

Shown in Table 7 are the polymer compositions and characteristics and yarn qualities of drawn yarns obtained by melt spinning, as in Example 1, polyparaxylyleneamides synthesized, as in Example 1, using as the dicarboxylic acid component a combination of azelaic acid with pimelic acid (both having odd numbers of carbon atoms). Further, the melt spun yarns were hot drawn at 100° C. and subjected to a constant length heat treatment at 180° C. for 15 minutes. The hot drawn yarns were relatively low in crystallinity and relatively high in shrinkage. After constant length heat treatment, the shrinkage of these yarns in boiling water was small.

TABLE 7
[Characteristics of copolyparaxylyleneamides and yarns thereof]

| Example | 5 | | 6 | | 7 | |
|---|---|---|---|---|---|---|
| Dicarboxylic acid composition (mole percent) | [1] 70 [2] 30 | | [1] 50 [2] 50 | | [1] 30 [2] 70 | |
| Melting point (° C.) | 264 | | 228 | | 252 | |
| Inherent viscosity | 1.09 | | 0.89 | | 0.93 | |
| Subjected to a constant length heat treatment | Yes | No | Yes | No | Yes | No |
| Spinning temperature | 290 | 290 | 260 | 260 | 280 | 280 |
| Drawing temperature | 100 | 100 | 100 | 100 | 100 | 100 |
| Drawing ratio | 5 | 5 | 5 | 5 | 4 | 4 |
| Tenacity (g./d.) | 3.4 | 4.3 | 5.3 | 5.9 | 4.5 | 4.6 |
| Elongation (percent) | 37.4 | 28.6 | 21.3 | 21.8 | 33.5 | 29.0 |
| Initial Young's modulus (g./d.) | 45.5 | 50.0 | 43.5 | 50.0 | 50.0 | 45.5 |
| Shrinkage in boiling water (percent) | 14.0 | 4.7 | 18.1 | 12.3 | 6.7 | 6.7 |

[1] Pimelic acid.
[2] Azelaic acid.

EXAMPLE 8

Forty-nine parts of paraxylylene diammonium azelate salt (PXD9 salt), 51 parts of paraxylylene diammonium sebacate salt (PXD10 salt), 0.5 part of benzoic acid, as a viscosity control agent, and 75 parts of water were well mixed. The mixture was charged in an autoclave and air inside the autoclave was replaced by nitrogen. Thereafter, the temperature was elevated to 285° C. and the internal pressure reached 10 kg./cm.². Condensed water was then discharged little by little, retaining said pressure for 3 hours. Thereafter, the amount of condensed water discharged was increased until said internal pressure was reduced to atmospheric pressure in 1 hour. Further, the temperature was elevated to 285° C. for 2 hours to complete the polymerization. The autoclave was then gradually cooled and the polymer removed from the autoclave was white and good in crystallinity. Its melting point was 250° C. and its inherent viscosity was 1.14. The composition of this copolymer, by molar ratio, was

PXD9/PXD10=50/50

Next, this polymer was melted at 263° C., extruded through a single orifice having a diameter of 0.3 mm. and wound up to make an undrawn monofilament, which was subsequently drawn to 6.0 times its original length using a hot pin at 70° C. and a hot plate at 150° C. to obtain a 29 denier drawn yarn with a tenacity of 6.9 g./d., an elongation of 17.0%, an initial Young's modulus of 37.0 g./d. and a shrinkage in boiling water of 13.3%. Further, this drawn yarn was treated in a relaxed state in boiling water for 30 minutes and then dried. As measured in a standard state, this yarn had a tenacity of 5.1 g./d., an elongation of 34.4% and it had a relatively large initial Young's modulus of 30.2 g./d.

EXAMPLE 9

As in Example 8, 29 parts of PXD9 salt and 71 parts of PXD10 salt were copolymerized to obtain a white crystalline copolymer with melting point of 257° C. and an inherent viscosity of 0.92. The composition of this copolymer, by molar ratio, was PXD9/PXD10=30/70.

Next, this copolymer was melted at 270° C. and extruded, as in Example 8, to obtain an undrawn monofilament, which was then drawn to 5.5 times its original length using a hot pin at 70° C. and a hot plate at 150° C. to obtain a drawn 23 denier yarn having a tenacity of 5.6 g./d., an elongation of 19.9%, an initial Young's modulus of 38.5 g./d. and a shrinkage in boiling water of 12.1%. This drawn yarn was then subjected to a relaxed heat treatment in boiling water and thereafter the yarn, as measured in a standard state, had a tenacity of 4.7 g./d., an elongation of 32.9% and an initial Young's modulus of 31.3 g./d.

EXAMPLE 10

As in Example 8, 69 parts of PXD9 salt and 31 parts of PXD10 salt were copolymerized to obtain a white crystalline polymer having a melting point of 256° C. and an inherent viscosity of 0.93. This copolymer, with a composition by molar ratio of PXD9/PXD10=70/30, was melted at 270° C. and extruded, as in Example 8 to produce an undrawn monofilament, which was drawn to 5.5 times its original length using a hot pin at 70° C. and a hot plate 150° C. to obtain a drawn 28 denier yarn having a tenacity of 4.5 g./d., an elongation of 26.2%, an initial Young's modulus of 42.4 g./d. and a shrinkage in boiling water of 11.4%. This drawn yarn was treated in a relaxed state in boiling water. Thereafter, the yarn, as measured in a standard state, had a tenacity of 3.8 g./d., an elongation of 36.3% and an initial Young's modulus of 32.8 g./d.

EXAMPLE 11

As in Example 8, 51 parts of PXD9 salt and 49 parts of paraxylylene diammonium suberate (PXD8 salt) were copolymerized to obtain a white crystalline polymer which had a melting point of 267° C. and an inherent viscosity of 1.33. The composition of this copolymer, as shown by molar ratio, was PXD8/PXD9=50/50. Next, this copolymer was melted at 283° C. and, as in Example 8, an undrawn monofilament was extruded. This filament was drawn to 5.0 times its original length using a hot pin at 70° C. and a hot plate at 150° C. to obtain a drawn 45 denier yarn having a tenacity of 7.0 g./d., an elongation of 15.5%, an initial Young's modulus of 44.6 g./d. and a shrinkage in boiling water of 13.8%. After being treated in a relaxed state in boiling water, this drawn yarn, in a standard state, had a tenacity of 5.2 g./d., an elongation of 32.6% and an initial Young's modulus of 36.1 g./d.

EXAMPLE 12

As in Example 8, 51 parts of PXD8 salt and 49 parts of paraxylylene diammonium pimelate salt (PXD7 salt) were copolymerized to obtain a white crystalline polymer, which had a melting point of 258° C. and an inherent viscosity of 1.23. The composition of this copolymer, as shown by molar ratio, was PXD7/PXD8=50/50.

Next, this copolymer was melted at 272° C. and, as in Example 8, an undrawn monofilament was extruded. This filament was drawn to 5.5 times its original length using a hot pin at 70° C. and a hot plate at 150° C. to obtain a drawn 68 denier yarn having a tenacity of 5.4 g./d., an elongation of 16.0%, an initial Young's modulus of 52.4 g./d. and a shrinkage in boiling water at 15.4%. After being treated in a relaxed state in boiling water, this drawn yarn, in a standard state, had a tenacity of 4.2 g./d., an elongation of 33.0% and an initial Young's modulus of 40.3 g./d.

EXAMPLE 13

As in Example 8, 51 parts of PXD7 salt and 49 parts of paraxylylene diammonium adipate (PXD6 salt) were copolymerized to obtain a white crystalline polymer which had a melting point of 290° C. and an inherent viscosity of 0.98. The composition of this copolymer, as shown by molar ratio, was PXD6/PXD7=50/50.

Next, this copolymer was melted at 300° C. and, as in Example 8, an undrawn monofilament was extruded. This filament was drawn to 5.0 times its original length using a hot pin at 70° C. and a hot plate at 150° C. to obtain a drawn 29 denier yarn having a tenacity of 5.8 g./d., and elongation of 14.9%, an initial Young's modulus of 58.9 g./d. and a shrinkage in boiling water of 14.%. After being treated in a relaxed state in boiling water, this drawn yarn, in a standard state, had a tenacity of 3.8 g./d., an elongation of 27.2% and an initial Young's modulus of 43.2 g./d.

COMPARATIVE EXAMPLE

Of the aliphatic α,ω-dicarboxylic acids having 6–12 carbon atoms, several pairs were selected whose numbers of carbon atoms differed by at least three carbon atoms. Each of these pairs were then copolymerized with paraxylylene, as in Example 8. Some of the characteristics of the cooplyamides thus produced are shown in Table 8.

Some of the qualities of the yarns obtained by melt spinning, as in Example 8, the copolyamides listed in Table 8, and hot drawing the undrawn monofilaments are listed in Table 9. After drawing, a sample of each of the yarns was treated in a relaxed state in boiling water. The denier, tenacity, elongation, and initial Young's modulus for the samples thus treated are shown in parentheses in Table 9 under the corresponding values for untreated yarn samples.

TABLE 9

| Number | Spinning temperature, °C. | Drawing temp., °C. Pin | Drawing temp., °C. Hot plate | Draw ratio | Denier | Tenacity, g./d. | Elongation, percent | Initial Young's modulus, g./d. | Shrinkage in boiling water, percent |
|---|---|---|---|---|---|---|---|---|---|
| 1 | 245 | 70 | 150 | 6.0 | 41 (57) | 63 (3.5) | 16.8 (36.9) | 48 (34) | 19.1 |
| 2 | 260 | 70 | 150 | 6.0 | 25 (30) | 7.1 (4.8) | 18.9 (40.0) | 42 (32) | 16.6 |
| 3 | 245 | 70 | 150 | 5.5 | 31 (38) | 3.9 (4.6) | 17.0 (40.8) | 46 (32) | 15.8 |
| 4 | 288 | 70 | 150 | 5.5 | 14 (15) | 6.0 (5.0) | 17.9 (46.4) | 45 (36) | 17.5 |
| 5 | 259 | 70 | 150 | 6.0 | 13 (15) | 7.1 (4.2) | 15.0 (31.0) | 46 (36) | 17.1 |

Generally, the copolyamides and the yarns to which Tables 8 and 9 pertain are unsuitable because of one or more deficiencies with respect to degree of crystallinity (too low), dimensional stability and shrinkage in boiling water.

TABLE 8

| Number | Dicarboxylic acid component | Composition molar ratio | Melting point, °C. | Glass transition point, °C. Dry | Wet | ΔT Glass | Inherent viscosity |
|---|---|---|---|---|---|---|---|
| 1 | Pimelic acid/dodecanedioic acid | 50/50 | 230 | 85 | 44 | 41 | 1.00 |
| 2 | Suberic acid/dodecanedioic acid | 50/50 | 245 | 84 | 44 | 40 | 1.19 |
| 3 | Azelaic acid/dodecanedioic acid | 50/50 | 235 | 82 | 52 | 30 | 1.04 |
| 4 | Adipic acid/sebacic acid | 50/50 | 280 | 99 | 26 | 73 | 1.00 |
| 5 | do | 30/70 | 256 | | | | 0.89 |

The following is claimed:

1. A fiber-forming copolyamide consisting essentially of the copolymerization reaction product of paraxylylene diamine and two α,ω dicarboxylic alkanes, each having 6–13 carbon atoms and one of said dicarboxylic alkanes having from 1–2 carbon atoms more than the other of said alkanes, wherein one of said two dicarboxylic alkanes comprises 10-90 mole percent of the total of said alkanes.

2. The fiber-forming copolyamide of claim 1 wherein said two dicarboxylic alkanes are sebacic acid and dodecanedioic acid.

3. The fiber-forming copolyamide of claim 1 wherein said two dicarboxylic alkanes are suberic acid and sebacic acid.

4. The fiber-forming copolyamide of claim 1 wherein said two dicarboxylic alkanes are pimelic acid and azelaic acid.

5. The fiber-forming copolyamide of claim 1 wherein said two dicarboxylic alkanes are azelaic acid and undecanedioic acid.

6. The fiber-forming copolyamide of claim 1 wherein said two dicarboxylic alkanes are undecanedioic acid and tridecanedioic acid.

7. The fiber-forming copolyamide of claim 1 wherein said two dicarboxylic alkanes are sebacic acid and azelaic acid.

8. The fiber-forming copolyamide of claim 1 wherein said two dicarboxylic alkanes are azelaic acid and suberic acid.

9. The fiber-forming copolyamide of claim 1 wherein said two dicarboxylic alkanes are suberic acid and pimelic acid.

10. The fiber-forming copolyamide of claim 1 wherein said two dicarboxylic alkanes are pimelic acid and adipic acid.

11. The fiber-forming copolyamide of claim 1 wherein said two dicarboxylic alkanes are undecanedioic acid and sebacic acid.

12. The fiber-forming copolyamide of claim 1 wherein said two dicarboxylic alkanes are dodecanedioic acid and undecanedioic acid.

13. The fiber-forming copolyamide of claim 1 wherein said two dicarboxylic alkanes are tridecanedioic acid and dodecanedioic acid.

14. Copolyamide filament consisting essentially of the copolymerization reaction product of paraxylylene diamine and two $\alpha, \omega$ dicarboxylic alkanes, each having 6–13 carbon atoms, and one of said two dicarboxylic alkanes having from 1–2 carbon atoms more than the other of said dicarboxylic alkanes, wherein one of said two dicarboxylic alkanes comprises 10–90 mole percent of the total of said dicarboxylic alkanes.

15. Copolyamide filament, as recited in claim 14, wherein said two alkanes are sebacic acid and dodecanedioic acid.

16. Copolyamide filament, as recited in claim 14, wherein said two alkanes are suberic acid and sebacic acid.

17. Copolyamide filament, as recited in claim 14, wherein said two alkanes are pimelic acid and azelaic acid.

18. Copolyamide filament, as recited in claim 14, wherein said two alkanes are azelaic acid and undecanedioic acid.

19. Copolyamide filament, as recited in claim 14, wherein said two alkane are undecanedioic acid and tridecanedioic acid.

20. Copolyamide filament, as recited in claim 14, wherein said two alkanes are sebacic acid and azelaic acid.

21. Copolyamide filament, as recited in claim 14, wherein said two alkanes are azelaic acid and suberic acid.

22. Copolyamide filament, as recited in claim 14, wherein said two alkanes are suberic acid and pimelic acid.

23. Copolyamide filament, as recited in claim 14, wherein said two alkanes are pimelic acid and adipic acid.

24. Copolyamide filament, as recited in claim 14, wherein said two alkanes are undecanedioic acid and sebacic acid.

25. Copolyamide filament, as recited in claim 14, wherein said two alkanes are dodecanedioic acid and undecanedioic acid.

26. Copolyamide filament, as recited in claim 14, wherein said two alkanes are tridecanedioic acid and dodecanedioic acid.

References Cited

UNITED STATES PATENTS

| | | | |
|---|---|---|---|
| 2,884,457 | 4/1959 | Ferstandig | 260—78 R |
| 3,053,813 | 9/1962 | Evans et al. | 260—78 R |
| 3,164,630 | 1/1965 | Pietrusza | 260—78 R |
| 3,475,387 | 10/1969 | Carter et al. | 260—78 R |

OTHER REFERENCES

Chemical Abstracts, vol. 70, 1969, 48548g and 58821e.

HAROLD D, ANDERSON, Primary Examiner

U.S. Cl. X.R.

57—140 R; 260—30.8 R